United States Patent
Thirion De Briel et al.

(10) Patent No.: US 6,267,216 B1
(45) Date of Patent: Jul. 31, 2001

(54) FRICTION PLATE, IN PARTICULAR FOR MOTOR VEHICLE CLUTCH

(75) Inventors: Jacques Thirion De Briel, Colombes; Emmanuelle Honore, Paris, both of (FR)

(73) Assignee: Valeo, Paris (FR)

( * ) Notice: Subject to any disclaimer, the term of this patent is extended or adjusted under 35 U.S.C. 154(b) by 0 days.

(21) Appl. No.: 09/402,098

(22) PCT Filed: Jan. 28, 1999

(86) PCT No.: PCT/FR99/00161

§ 371 Date: Jan. 13, 2000

§ 102(e) Date: Jan. 13, 2000

(87) PCT Pub. No.: WO99/39110

PCT Pub. Date: Aug. 5, 1999

(30) Foreign Application Priority Data

Jan. 28, 1998 (FR) .................................................. 98 00891
Jan. 28, 1998 (FR) .................................................. 98 00153
Dec. 21, 1998 (FR) .................................................. 98 16100

(51) Int. Cl.$^7$ .................................................. F16D 13/64
(52) U.S. Cl. ..................................... 192/107 C; 192/52.6
(58) Field of Search ............................. 192/107 C, 52.6, 192/52.1, 200

(56) References Cited

U.S. PATENT DOCUMENTS

| 4,993,531 |   | 2/1991 | Villata . |   |
|-----------|---|--------|-----------|---|
| 5,452,783 | * | 9/1995 | Thirion de Briel et al. | 192/107 C |
| 5,522,490 | * | 6/1996 | Thirion de Briel et al. | 192/107 C |
| 5,601,173 | * | 2/1997 | Thirion de Briel et al. | 192/107 C |
| 5,794,754 | * | 8/1998 | Villata | 192/107 C |
| 5,934,434 | * | 8/1999 | Viola | 192/107 C |
| 6,015,035 | * | 1/2000 | Mizukami | 192/107 C |

FOREIGN PATENT DOCUMENTS

0579554A2    1/1994  (EP) .

* cited by examiner

*Primary Examiner*—Charles A Marmor
*Assistant Examiner*—Saúl Rodríguez
(74) *Attorney, Agent, or Firm*—Liniak, Berenato, Longarce & White

(57) ABSTRACT

The invention concerns a friction plate (15) in particular for motor vehicle clutch, comprising a support ring-shaped disk (14) whereof the outer peripheral part is divided into radial blades (70) bearing friction linings, in particular axially on either side, each blade (70) being of the tripod type and having, by means of folds (77, 78), a central bearing zone (76) linked to the disk (14) central part (114) and two peripheral bearing zones (75), characterized in that each of the two peripheral bearing zones (75) is connected (214) to the disk (14) central part (114).

10 Claims, 5 Drawing Sheets

FRICTION PLATE, IN PARTICULAR FOR MOTOR VEHICLE CLUTCH

INTERNATIONAL PATENT APPLICATION NO. PCT/FR99/00161, PUBLICATION NO. WO99/39110

BACKGROUND OF THE INVENTION

1. Field of the Invention

The present invention relates to a friction disc, especially for a motor vehicle clutch.

2. Description of Related Art

More particularly the invention is concerned with a friction disc of the same type as that described and shown in the document EP-A-0 579 554.

That document describes and shows a friction disc comprising a plate for supporting friction liners in the form of a ring, with its outer peripheral portion being divided into radial blades carrying friction liners which are arranged, in particular, axially on either side of the support plate, with each blade being of tripod type and having, by virtue of folds, a central engagement zone which is joined to the central portion of the plate, together with two peripheral engagement zones which are arranged tangentially on either side of the central engagement zone.

This design, in which the tripod type blades have a form which is generally symmetrical with respect to a radial axis of symmetry, enables the blades to have as great a resistance to centrifugal force as is desired, with the central engagement zone serving to fasten a first one of the friction liners, while the peripheral engagement zones are arranged to come into contact with the second one of the friction liners.

In addition, contact with, in particular, the pressure plate of the clutch is greatly improved by avoiding the situation where the zone in which the friction liners are subjected to the pressure from one or other of the two plates between which the friction disc is gripped, is displaced progressively towards the axis of the assembly, so wear in the friction liners is thus generally even and regular.

The design according to the prior art accordingly proposes a standard carrier disc for liners which is able to rotate at high speed while reducing seizing and jamming effects, and is at the same time capable of adopting a conical form.

The present invention is concerned with an improvement to a friction disc of the same type as that described and shown in the document EP-A-0 579 554, which in particular gives a further increase in the capacity to resist centrifugal force and/or to resist deformation resulting in variations in operating temperature, these effects most particularly affecting the peripheral engagement zones of each tripod type blade.

SUMMARY OF THE INVENTION

To this end, the invention proposes a friction disc characterised in that each of the peripheral engagement zones is joined to the central portion of the plate.

According to further features of the invention:

each tripod type blade has an axis of radial symmetry;

each central engagement zone is joined to the central zone of the plate by means of a tangential fold at right angles to the axis of radial symmetry of the tripod blade that constitutes the foot of the blade, and enables the central engagement zone to be offset axially with respect to the general plane of the central zone of the plate;

each central engagement zone is joined to the peripheral zones by means of folds which are oblique with respect to the axis of radial symmetry of the tripod type blade;

the peripheral engagement zones are offset axially with respect to the plane of the central engagement zone, being parallel to the latter;

the peripheral engagement zones lie in the plane of the central portion of the plate;

the peripheral engagement zones are offset axially with respect to the plane of the central portion of the plate;

each of the peripheral engagement zones is joined to the central portion of the plate by a generally radially oriented band;

the connecting band extends substantially parallel to the adjacent oblique fold that joins the corresponding peripheral engagement zone to the central engagement zone;

each of the said peripheral engagement zones is joined directly to the central portion of the plate by a connecting band coplanar with the central portion of the plate and the peripheral engagement zone;

the connecting bands of two neighbouring peripheral engagement zones which are part of two consecutive tripod type blades, are formed as a single connecting band oriented generally radially;

the connecting bands of two neighbouring peripheral engagement zones which are part of two consecutive tripod type blades are independent of each other;

the said tripod type blades are arranged in circumferential alternation with a series of radial tongues, each of which has at its free end, by virtue of a fold, a supplementary engagement zone;

the supplementary engagement zone is joined to the central portion of the plate by means of a tangential connecting fold at right angles to the axis of radial symmetry of the tongue;

each peripheral engagement zone is joined to the central portion of the plate by a connecting band, the radially inner end of which is situated radially inward of the tangential connecting fold of the supplementary engagement zone of the neighbouring radial tongue;

each central engagement zone comprises a radially inner portion and a radially outer portion which is narrower in the circumferential direction than the inner portion;

each central engagement zone is bounded radially by an arcuate outer edge;

each central engagement zone is bounded radially by a rectilinear tangential outer edge;

each radial tongue is bounded radially by an arcuate outer edge;

the tripod type blades are distributed as two sets of blades, the peripheral engagement zones of the blades of one of the sets and their connecting bands being in the plane of the central engagement zone of the blades of the other set.

BRIEF DESCRIPTION OF THE DRAWINGS

Further features and advantages of the invention will appear on a reading of the following detailed description, for an understanding of which, reference is made to the attached drawings, in which.

DETAILED DESCRIPTION OF THE PREFERRED EMBODIMENTS

In the following description, components which are identical, similar or analogous to each other are designated by the same reference signs.

Figure 5:
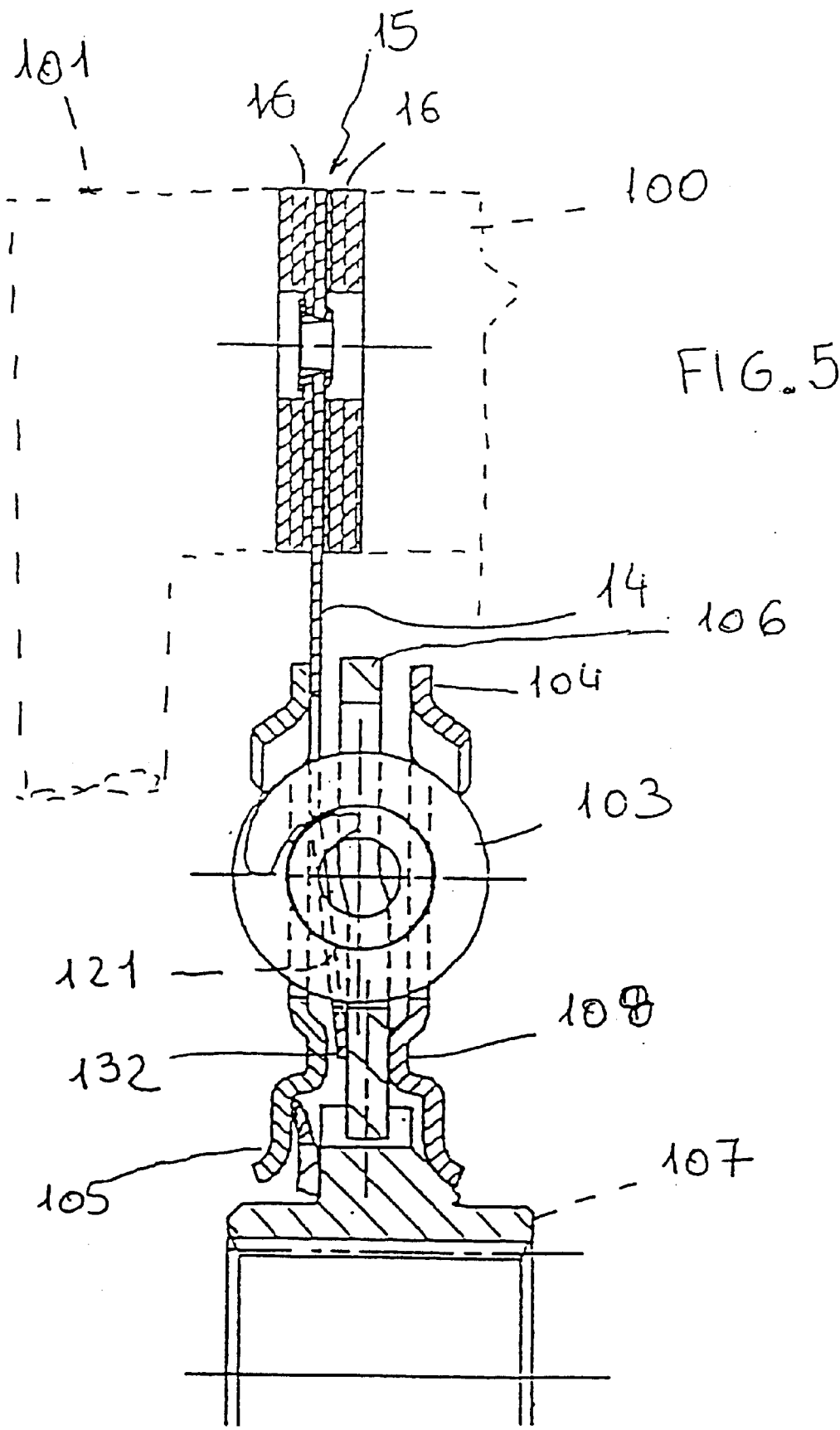
FIG. 5 is a partial half view showing a torsion damping device equipped with a plate in accordance with the invention.

In the drawings, in order to simplify the description it will be noted that it is chosen to show the friction liners, with which the friction disc is equipped on its two opposed axial faces, in FIG. 5 only.

Each friction liner may consist of a continuous annular ring, or it may be divided into blocks or tiles, separated from each other by generally radially oriented slots.

Figure 1:
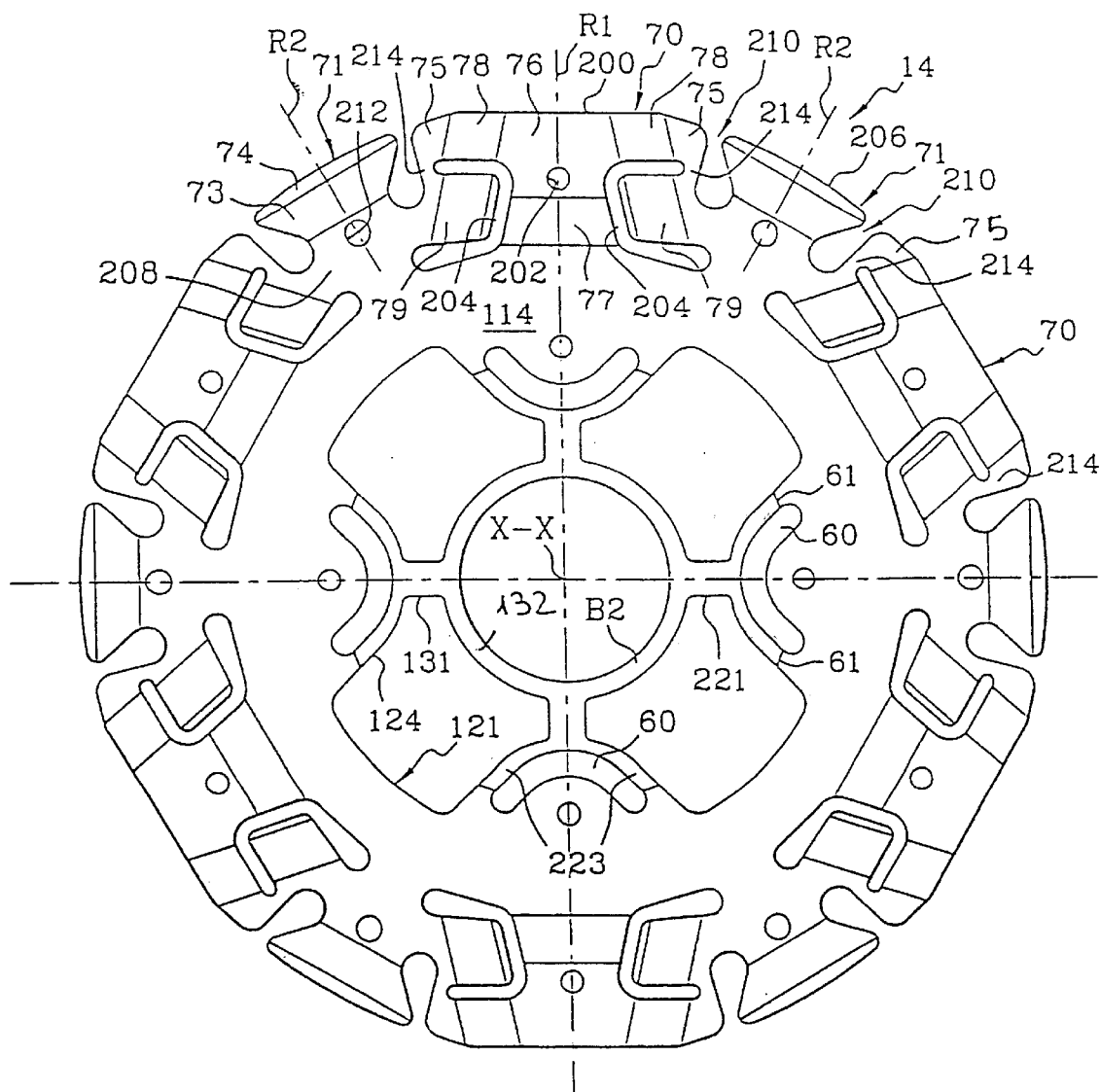
FIG. 1 is a front view of a first embodiment, by way of example, of a carrier plate for friction liners, constituting a friction disc in accordance with the features of the invention, and having, arranged alternately with each other, blades of a tripod type and radial tongues.

Thus, FIG. 1 only shows the carrier plate in the general form of a ring which serves as a support for the friction liners 16 which, with the carrier plate 14, constitute a friction disc 15.

The plate 14 is a thin sheet metal component formed by pressing and bending.

The carrier plate 14 consists essentially of an annular central portion 114 which is situated generally inward in the radial sense with respect to the axis X—X of the plate 14, while its peripheral outer portion, which lies radially outward of the central portion 114, is divided or broken into radial blades 70, of which there are six in this example and which are spaced apart circumferentially at regular intervals about the axis X—X, together with the appropriate number of radial tongues 71 which are arranged circumferentially in alternation with the blades 70.

The central portion 114, in the sense of this invention, of the plate 14 for carrying the liners is a flat portion which lies in a plane at right angles to the axis X—X.

In accordance with a design which is known in particular from the document EP-A-0 579 554, each blade 70 is of the so-called "tripod" type.

Reference can also be made to the contents of the document FR-A-2 702 811 or the document U.S. Pat. No. 5,452,783 for information about the alternate arrangement of blades of tripod type with tongues.

Each tripod blade 70 has a central engagement zone on which there bears, and is fixed, a first friction liner 16, together with two peripheral engagement zones 75 for contact with the second friction liner 16.

Each tripod blade 70 has a general symmetry of design with respect to a radial axis R1.

Thus the two peripheral engagement zones 75 are arranged tangentially on either side of the central engagement zone 76, which itself has a symmetry of design with respect to the radial axis of symmetry R1.

In the first embodiment, shown by way of example in FIG. 1, the two peripheral zones 75 of each blade 70 are flat, and are situated in the same plane as that of the annular central portion 114.

The central engagement zone 76 is also a flat zone, but it lies in a plane which is offset axially with respect to that of the annular central zone 114.

To this end, the central engagement zone 76 is joined on the inside, in the radial sense, to the annular central zone 114 of the plate 14 through a tangential fold 77 which extends in a direction which is generally at right angles to the radial axis of symmetry R1.

Similarly, each of the peripheral engagement zones 75 is joined to the central engagement zone 76 through an oblique fold 78.

The oblique folds 78 are oriented generally radially, but they are inclined with respect to the radial axis of symmetry R, in such a way that each central engagement zone 76 comprises an inner portion, in the radial sense, adjacent to the tangential fold 77, and an outer portion, in the radial sense, which is bounded by a straight outer edge 200 which is tangential and parallel to the told 77, which is narrower in the circumferential direction than the inner portion.

In the example shown in FIG. 1, each central engagement zone 76 also includes, by way of example, a hole 202 for the passage through it of a rivet for fastening the friction liner or liners.

Each tripod blade 70 is joined to the central portion 114 of the plate 14 by its tangential fold 77, which constitutes the foot, radially on the inside, of the tripod blade.

In the embodiment shown in FIG. 1, the central engagement zone 76 and the peripheral engagement zones 75 are also bounded by generally C-shaped cut-out slots 204, the horizontal branches of which extend tangentially through the oblique folds 78.

Each radial tongue 71 includes at its outer radial end, bounded by an arcuate outer edge 206, a supplementary engagement zone 74 for a friction liner.

The zone 74 of each radial tongue 71 is joined to the annular central portion 114 of the plate 14 through a tangential fold 73.

The tangential fold 73 is generally at right angles to the radial axis of symmetry R2 of the tongue 71.

More precisely, each tangential fold 73 joins the supplementary engagement zone 74 to an intermediate portion 208, which constitutes the foot of the tongue 71 and is arranged radially between the annular central zone 114 and the tangential fold 73, the said foot portion 208 extending the annular central portion 114 and lying in the same plane as the latter, and for example in the same plane as the peripheral engagement zones 75.

By contrast, due to the presence of the tangential fold 73, the supplementary engagement zone 74 is offset axially with respect to the plane of the annular central portion 114, and it lies for example in substantially the same plane as the central engagement portions 76 of the tripod blades 70.

Each tongue 71 is bounded circumferentially with respect to the two adjacent tripod blades 70 by two generally radially oriented slots 210, which are oblique with respect to the radial axis of symmetry R2, in such a way that each tongue 71 comprises a radially inner portion and a radially outer portion wider circumferentially than the internal portion consisting of the foot 208.

Each internal portion consisting of a foot 208 also has a hole 212 for the passage through it of a rivet for fastening a friction liner or liners, and in this example the second friction liner.

In accordance with the features of the invention, and as can be seen in FIG. 1, each of the peripheral engagement zones 75 is joined to the annular central portion 114 of the plate 14 by a connecting strip 214.

Each connecting strip 214 is formed integrally in one piece with the plate 14, and it extends in a generally radial direction.

More precisely, in the embodiment shown in FIG. 1, each connecting strip is adjacent to the oblique fold 78 that separates the peripheral engagement zone 75, which it joins to the annular central portion 114, from the central engagement zone 76.

In this first embodiment, the inner radial end of each connecting strip 214 joins the peripheral engagement zone 75 to the foot 208 of the adjacent radial tongue 71, and it therefore joins it indirectly to the annular central portion 114.

Thus, each peripheral engagement zone 75 is joined firstly to the central engagement zone 76 by means of an oblique fold 78, and to the annular central portion 114 by means of the connecting strip 214 which joins it to the foot 208 of a radial tongue 71.

As can be seen in FIG. 1, the base of each slot 210 which lies radially towards the inside is widened, and has a semicircular profile so as to give, at the same time, the configuration of the radial tongues 71 and that of the connecting strips 214, while avoiding any rupture points in this area.

Lugs 79 are arranged tangentially on either side of the tangential fold 77, and their form is a result of the C-shaped cut-out slots 204.

The lugs 79 are intersected by the folds 78, and they have a root zone in the plane of a peripheral engagement zone 75, which in this example is in the plane of the radial tongues 71 and of the central annular portion 114 of the plate 14. The ends of the lugs 79 are in the plane of the central engagement zones 76.

In the embodiment shown in FIG. 1, and in order to enable it to be incorporated in a torsion damping device, the plate 14 has an elastic, bent central portion which is situated inwardly, in the radial sense, with respect to the annular central portion 114, and to which the tripod blades 70 and the radial tongues 71 are joined.

The central portion includes lugs 131, a continuous central annular ring portion 132, and windows 121 which are arranged for the passage through them, with a clearance, of springs 103 of the torsion damper. The windows 121 do not have any flanges, and do not serve for holding the springs.

Each of the lugs 131 is bounded on the outside, firstly by a crescent-shaped aperture 60 which extends inwardly of a hole for passage through it of a spacer bar of the torsion damper, and secondly, by a bend line 61. This bend line 61 is in two parts, on either side of an aperture 60.

The parts of the bend line 61 extend from the aperture 60 to the side edge 124 of a window 121 which is bounded radially on the inside by the ring portion 132.

The lugs 131 lie radially between two consecutive windows 121, and they terminate laterally in these consecutive windows.

The lugs 131 are joined on the inside to the ring portion 132. It will be noted that the lower corners 221 of the windows are widened in the circumferential sense, in such a way that the lugs 131 are in the form of a thin band of matter, oriented radially and extending between two adjacent corners 221, to expand radially beyond the corners so as to have two curved portions 223 matching the form of an aperture 60.

It is possible to modify the thickness of the elastically resilient lugs 131 by modifying the form of the cut-outs, and especially the form of the aperture 60 and the corners 221, and/or the bend angle. It is thus possible to eliminate the corners 221.

The lugs 131 are inclined axially in such a way that the central ring portion 132 is offset axially with respect to the plane in which the central annular portion 114 lies.

As will be clear from the foregoing description, the plate 14 is mechanically treated and heat treated to give it the required elasticity.

The tongues 71 have a circumferential extent which is smaller than that of the blades 70, the central engagement zone 76 of which serves for fastening, in this example by riveting, of the second one of the friction liners 16.

The zones 75 lie at the outer periphery of the blade 70, radially outwards of the fold 77, and they are arranged to come into contact with the second one of the friction liners 16.

The portion 74 is a supplementary portion for the first one of the friction liners 16.

It will be noted that the cut-outs 204 of any one blade 70 extend in opposite directions from each other.

In this example (FIG. 5), the first friction liner 16 is adapted to cooperate with the pressure plate 100 of the friction liner, while the second friction liner 16 is adapted to cooperate with the reaction plate 101 of the clutch, which is indicated diagrammatically in broken lines as is the pressure plate 100, which deforms to a greater extent under heat that the reaction plate. In FIG. 5, the ring portion 132 bears elastically on a damper plate 106 which meshes, with a circumferential clearance, with a hub 107 which is splined internally for coupling it with a driven shaft.

On either side of the damper plate 106, there are arranged two guide rings 104, 105 which are joined together by spacer bars (not shown), the springs 103 being mounted in the windows formed in facing relationship in the damper plate 106 and the guide rings 105, 104, one of which is provided with one or more cut-outs 108 for making contact with the hub plate 106 under the axial biasing force exerted by the plate 14.

In this way there is no need to provide an axially acting resilient ring, because of the carrier plate 14 which is configured as a resilient ring.

The plate 14, and therefore the friction disc 15 consisting of the plate 14 and liners 16, is, thanks to the invention and in this case thanks to the connecting strips 214, stiffened and made more robust, and is less sensitive to centrifugal force and to thermal effects, without the external peripheral engagement zones 75 being omitted. This solution is simple and inexpensive.

Figure 3:
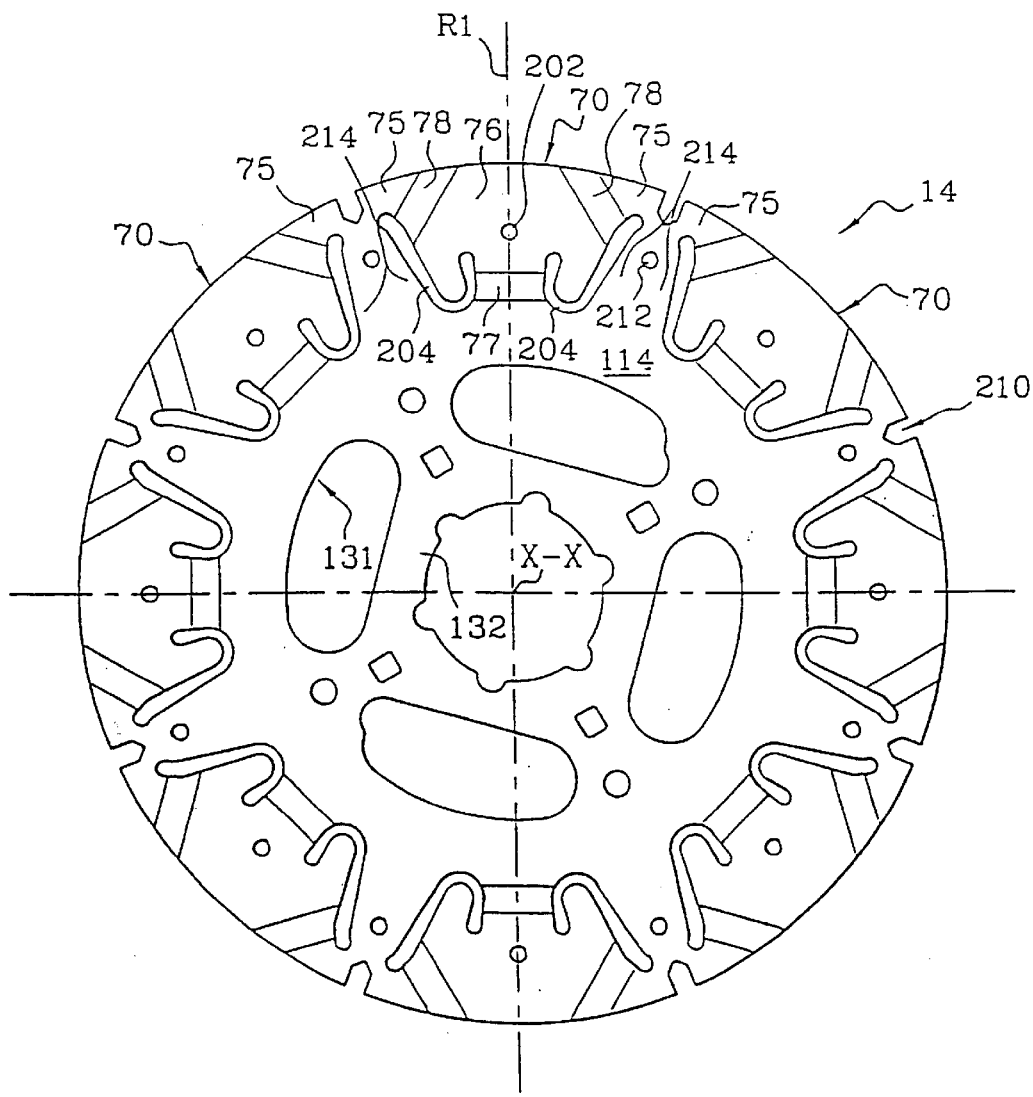
FIG. 3 is a view similar to those in FIGS. 1 and 2, showing a second embodiment by way of example of a carrier plate for a friction disc in accordance with the features of the invention which does not have any tripod type blades.

The connecting strips 214 may have a double function and may replace the tongues 71 in the manner to be described for the embodiment shown in FIG. 3.

Figure 4:
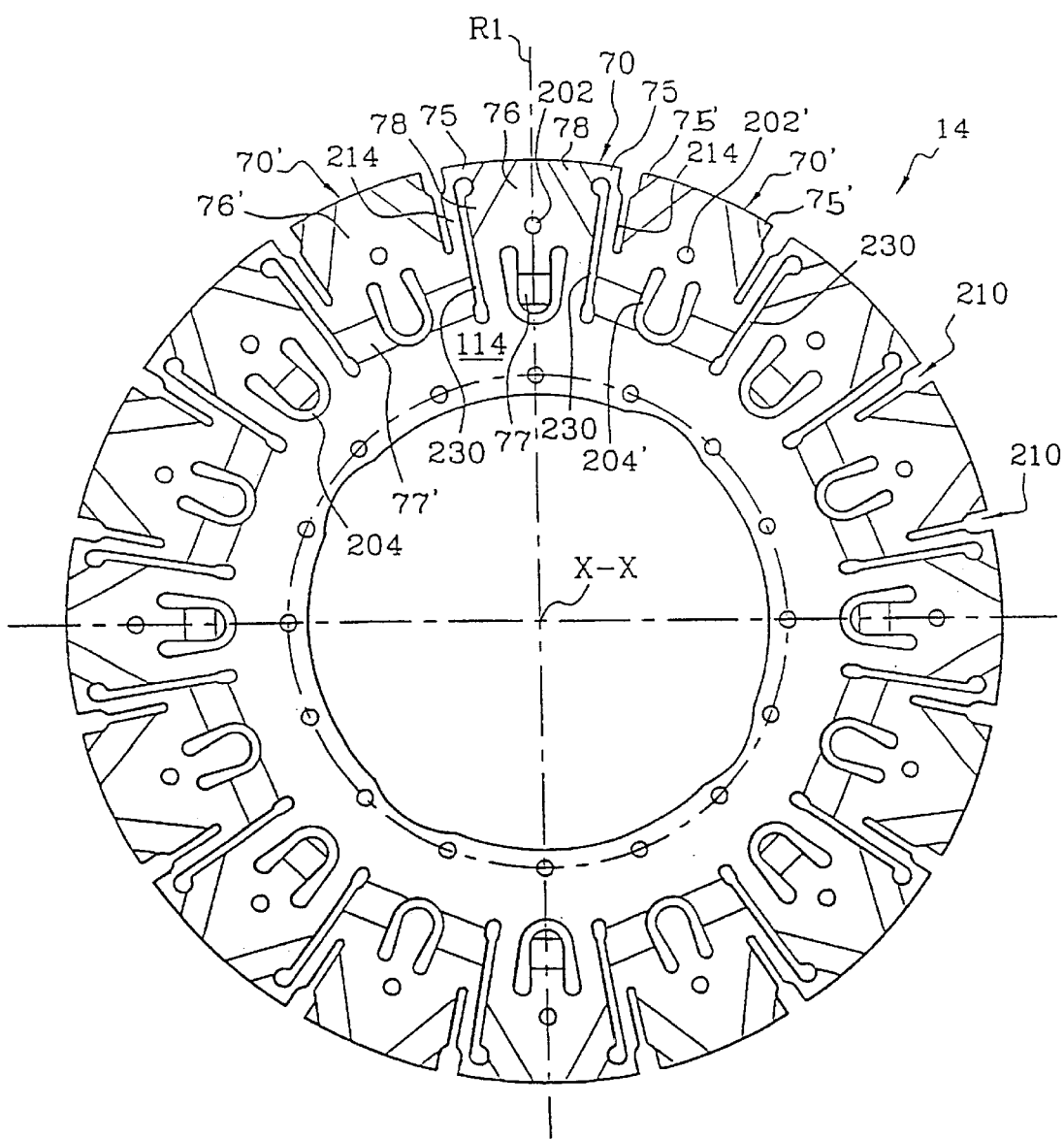
FIG. 4 is a view similar to those in FIGS. 1 to 3, but shows a third embodiment, by way of example, of a carrier plate for use in constructing a friction disc in accordance with the features of the invention which only has tripod type blades, these being spaced apart in two sets of alternate blades.

The tongues 71 may be replaced by blades 70 in the manner described for the embodiment shown in FIG. 4.

Figure 2:
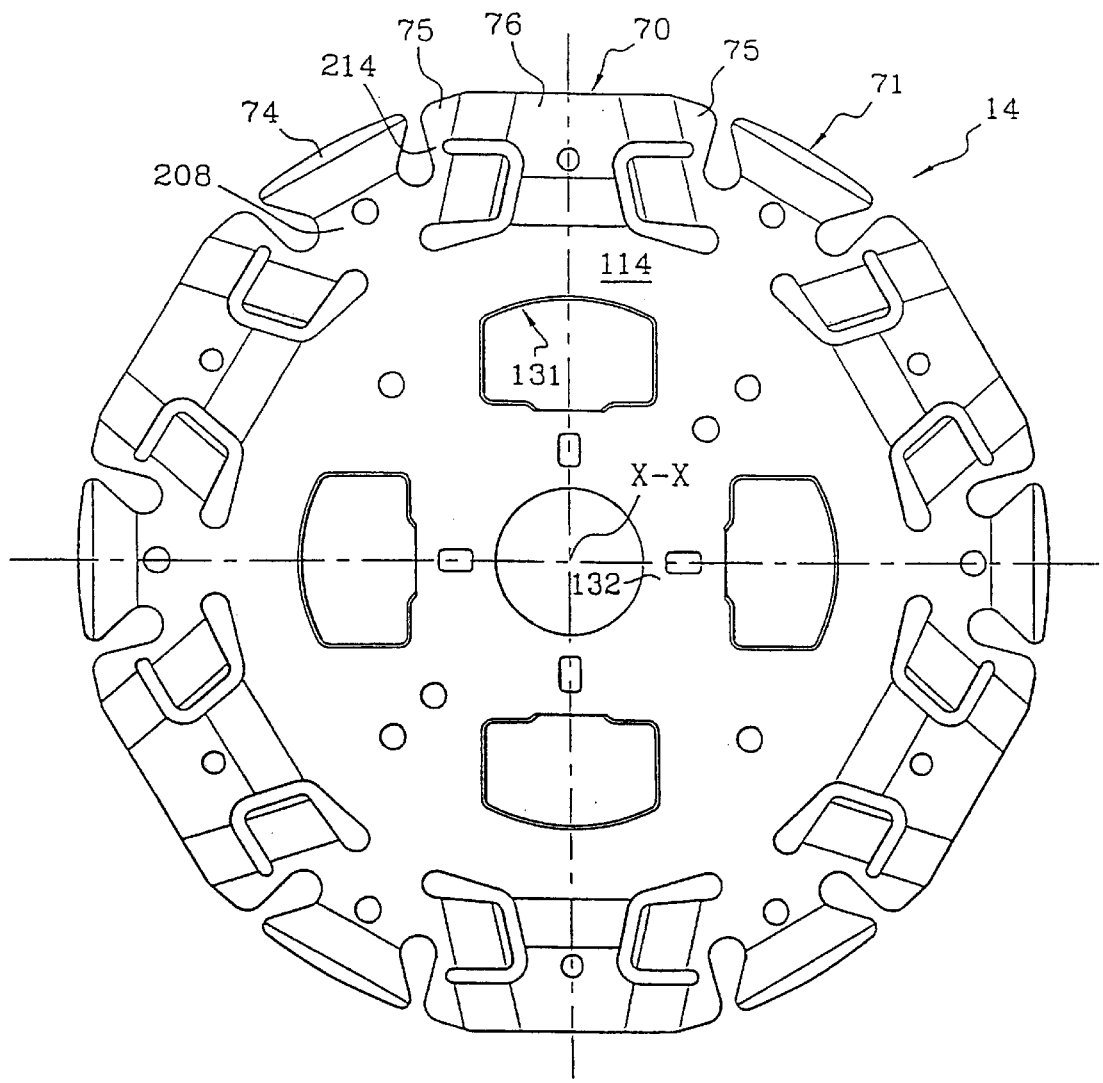
FIG. 2 is a view similar to that in FIG. 1, showing another version of the first embodiment.

In the embodiment shown by way of example in FIG. 2, the radially innermost portion of the plate 14 has windows 131 which are generally rectangular in form, but it is not bent elastically, that is to say the central ring portion 132 is situated in generally the same plane as that of the annular central portion 114.

The embodiment shown in FIG. 3 will now be described. In this Figure it can be seen first of all that there are no radial tongues interposed between the tripod blades 70, of which there are eight consecutive blades in this example.

All of the central engagement zones 76 are coplanar, as are all of the peripheral engagement zones 75.

In accordance with the features of the invention, and as in the case of the embodiments described above with reference to FIGS. 1 and 2, each peripheral engagement zone 75 is joined to the annular central portion 114 of the plate 14 by means of a connecting strip 214.

Because of the absence of radial tongues 71, the connecting strips 214 which join two peripheral engagement zones 75 of two consecutive and adjacent tripod blades are made in the form of a single connecting strip having a greater tangential width, which extends in a radial direction.

The holes 212 for passage through them of rivets for fastening friction liners, formed in the preceding case in the radial tongues 71, are here formed in the widened connecting strips 214.

The central engagement zones 76 and the connecting strips 214 are bounded by cut-outs 204, which are in the form of walking sticks facing in opposite directions.

The radially innermost portion of the plate 14 has cut-outs or windows 131, oriented generally tangentially and generally of an oblong bean shape, each of which is slightly inclined inwardly in the radial sense with respect to the tangential direction.

There are four of these windows, and they are offset circumferentially with respect to the radial axes of symmetry R1 of the tripod blades 70.

The central ring portion 132 lies in the same plane as the central annular portion 114 without elastic bending.

In the embodiment shown in FIG. 4, as in that shown in FIG. 3, there is no radial tongue 71 and the outer peripheral portion of the plate 14 is divided into sixteen consecutive and adjacent tripod blades, which are spaced apart circumferentially at regular intervals about the axis X—X.

The sixteen tripod blades are arranged in two alternate series of eight tripod blades 70 and 70'.

Each of the blades 70 of the first set of eight blades has a general design which is in accordance with the features of the invention.

Thus they comprise a central engagement zone 76 and two peripheral engagement zones 75.

By contrast, if such a blade 70 is compared to that shown by way of example in FIG. 1, the central engagement zone 76 is coplanar with the annular central portion 114 of the plate 14, while the peripheral engagement zones 75 are offset axially with respect to this plane, by virtue of oblique junction folds 78.

Each peripheral zone 75 is joined radially to the annular central zone 114 through a connecting strip 214 which extends radially inwards from the corresponding peripheral engagement zone 75.

The peripheral engagement zones 75 of a blade 70 are coplanar with the central engagement zone 76' of the adjacent tripod blade 70'.

Thus, all of the central engagement zones 76 are coplanar with each other, and coplanar with the peripheral engagement zones 75' of the blades 70', while all of the central engagement zones 76' of the tripod blades 70' are coplanar with each other and coplanar with the peripheral engagement zones 75 of the blades 70 and with the connecting strips 214.

Each connecting strip 214 thus indirectly assures connection of a peripheral engagement zone 75 of a blade 70 with the central annular portion 114 through an interposed tangential fold 77', which constitutes a foot joining a blade 70' to the central annular portion 114.

The connecting strips 214 are bounded tangentially with respect to a central engagement zone 76 by a radially oriented rectilinear cut-out 230, while the central engagement zones 76 and 76' are bounded radially on the inside by cut-outs 204 and 204' which are U-shaped, with their central branches being disposed radially inwards in the direction of the axis X—X.

In the embodiment shown in FIG. 4, the plate 14 for carrying the friction liners, is of a simplified design, that is to say it does not have the radially inward part beyond its central annular portion 114.

Any method of fastening and configuring the friction liners whatever may be used, and this fastening method may be by riveting and/or adhesive bonding, or by any other suitable means.

Thus, the presence of the holes 202, 202', 212 is not obligatory in FIGS. 1 to 4.

In this connection, the friction liners may be adhesively bonded on the central engagement zones of the tripod blades and on the inner portions of the tongues.

The central engagement zones, in a first embodiment, are totally coated with adhesive. In a second embodiment, the central engagement zones are coated with one or more bands of adhesive extending close to the side edges of each of the said zones, within the latter for fastening of the friction liner concerned in the manner described in the document WO-A-98/44272, to which reference should be made for more detail.

In FIG. 5, the plate 14 is fitted between one of the guide rings, 105, and the damper plate 106. In another version, the plate 14 may be fitted on the same side as the guide ring 105, opposite to the damper plate 106. In that case, a friction device is arranged to act as a spacer between the damper plate 106 and the ring 105.

What is claimed is:

1. A friction disc (15), for a motor vehicle clutch, comprising a support plate in the form of a ring, the outer peripheral portion of which is divided into radial blades (70) carrying friction liners, located in particular axially on either side of it, each blade (70) being of tripod type and having, by virtue of folds (77, 78), a central engagement zone (76) joined to the central portion (114) of the plate (14), and two peripheral engagement zones (75) disposed tangentially on either side of the central engagement zone (76), characterized in that each of the peripheral engagement zones (75) is joined to the central portion (114) of the plate (14) by means of a connecting band (214).

2. A friction disc according to claim 1, characterized in that each blade (70) has an axis of radial symmetry (R1), in that each central engagement zone (76) is joined to the peripheral zones (75) by means of said folds (78) which are oblique with respect to the axis of radial symmetry (R1) of the blade (70), and in that the peripheral engagement zones (75) are offset axially with respect to the plane of the central engagement zone (76), being parallel to the latter.

3. A friction disc according to claim 2, characterized in that each central engagement zone (76) is joined to the central zone (144) of the plate by means of a tangential fold (77) at right angles to the axis of radial symmetry (R1) of the tripod blade (70) that constitutes the foot of the blade, and enables the central engagement zone (76) to be offset axially with respect to the general plane of the central zone (114) of the plate (14).

4. A friction disc according to claim 2, characterized in that each of the peripheral engagement zones (75) is joined to the central portion (114) of the plate (14) by the connecting band (214).

5. A friction disc according to claim 4, characterized in that the connecting band (214) extends substantially parallel to an adjacent oblique fold (78) that joins the corresponding peripheral engagement zone (75) to the central engagement zone (76).

6. A friction disc according to claim 5, characterized in that each of the said peripheral engagement zones (75) is joined directly to the central portion (114) of the plate (14) by a connecting band (214) coplanar with the central portion (114) of the plate (14) and the peripheral engagement zone (75).

7. A friction disc according to claim 6, characterized in that the connecting bands (214) of two neighbouring peripheral engagement zones (75) which are part of two consecutive tripod type blades (70), are formed as a single connecting band (214) oriented generally radially.

8. A friction disc according to claim 7, characterized in that the said tripod type blades (70) are arranged in circumferential alternation with a series of radial tongues (71), each of which has at its free end, by virtue of a fold (73), a supplementary engagement zone (74).

9. A friction disc according to claim 8, characterized in that the supplementary engagement zone is joined to the central portion (114) of the plate (14) by means of a tangential connecting fold (73) at right angles to the axis of radial symmetry of the tongue (71), and in that each peripheral engagement zone (75) is joined to the central portion (114) of the plate (14) by a connecting band (214), the radially inner end of which is situated radially inward of the tangential connecting fold (73) of the supplementary engagement zone (74) of the neighbouring radial tongue (71).

10. A friction disc according to claim 4, characterized in that the tripod type blades are distributed as two sets of blades (70, 70'), the peripheral engagement zones (75) of the blades (70) of one of the sets and their connecting bands (214) being in the plane of the central engagement zone (76) of the blades (70) of the other set.

* * * * *